United States Patent Office 2,799,855
Patented July 16, 1957

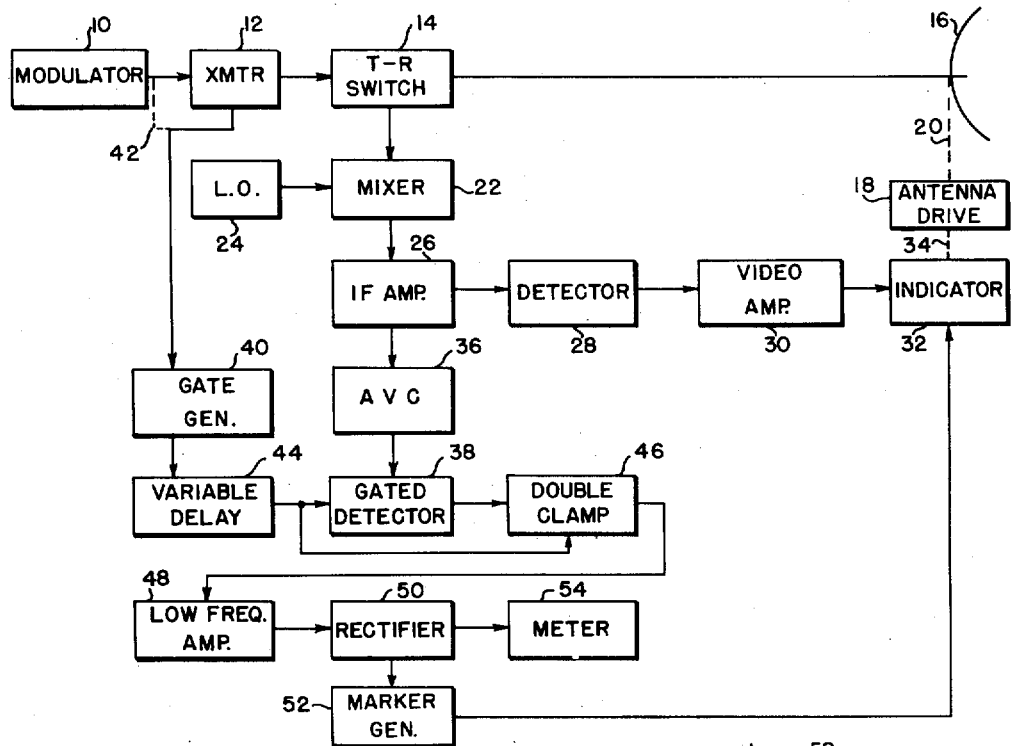
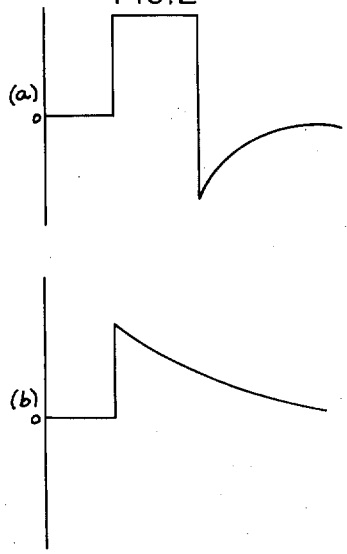
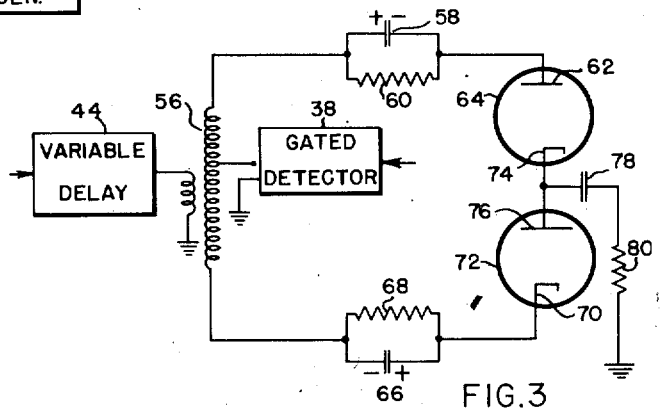

2,799,855

RADAR SYSTEM FOR DETERMINING GROUND SPEED AND COURSE OF A MOVING CRAFT

David Gale, New York, N. Y., assignor, by mesne assignments, to the United States of America as represented by the Secretary of War Application January 29, 1946, Serial No. 644,162

11 Claims. (Cl. 343—9)

The present invention relates to an airborne radio object locating system and more particularly to a system of this type which is adapted to provide both ground track and ground speed information concerning the movement of the aircraft.

The ground track is the path of a moving aircraft relative to the ground and is therefore an orthogonal projection on the ground of the aircraft's actual forward line of travel. Due to external forces such as wind, the ground track will in general differ from the bearing of the aircraft's axis as indicated by the usual navigational compass. The angular difference between the compass bearing and the ground track is termed drift angle.

As disclosed in the copending application of Rubby Sherr entitled "Communication System," Serial No. 624,907, filed October 26, 1945, now abandoned, the ground track of an aircraft may be determined by employing in the aircraft a radio object locating system. In such a system echo pulses received at the aircraft from each individual target are inherently amplitude modulated and the frequency of this amplitude modulation is a minimum when the center line of the antenna beam is coincident with the ground track either in the direction of travel or the direction opposite thereto. Thus by positioning the directional antenna of the radio object locating system until the frequency of amplitude modulation of the received echo pulses is a minimum, the ground track of the aircraft may be determined.

In addition to the fact stated above, namely that the modulation frequency is a minimum when the center line of the antenna beam is coincident with the ground track of the aircraft, the actual frequency of this amplitude modulation is also a function of the ground speed of the aircraft. The amplitude modulation of the received echo pulses thus provides information relating to both the ground speed and the ground track of an aircraft.

It is therefore an object of the present invention to provide means operating in conjunction with a radio object locating system for determining the ground speed of an aircraft.

It is another object of the present invention to provide means operating in conjunction with a radio object locating system for giving a continuous indication of ground track said ground track being provided when the directional antenna of the system is continuously scanning as well as when it is stationary.

It is a still further object of the present invention to provide a voltage whose amplitude is a function of the modulation frequency of the object returned echo pulses received by a radio object locating system.

Other objects of the present invention will become more apparent from the following detailed description which is to be read in connection with the accompanying drawing wherein:

Fig. 1 is a schematic diagram in block form of one embodiment of the present invention;

Fig. 2 illustrates certain waveforms pertinent to the diagram of Fig. 1; and,

Fig. 3 is a schematic circuit diagram of a portion of the system shown in Fig. 1.

In the present invention a voltage proportional to the frequency of the modulation envelope of returned echo pulses is obtained and this voltage is utilized to provide the desired ground track and the ground speed information. In order to obtain this voltage a portion of the radio object locating system is adapted to receive echo pulses only from objects at a predetermined range from the aircraft. This may be accomplished by making a portion of the receiver of the radio object locating system normally nonresponsive to object returned echo pulses. At a time after the time of occurrence of the transmitted exploratory pulse which corresponds to the predetermined distance, however, a sensitizing voltage is applied to this portion of the receiver thereby making it responsive to echo pulses returned from objects at the predetermined range. Such a sensitizing voltage is often referred to as a gate or gate voltage and the received echo pulses are said to be range gated.

As mentioned above, the received echo pulses will be amplitude modulated due principally to the fact that there is relative motion between the aircraft and targets on the ground. This modulation is periodic in character and accordingly has a definite frequency. It is apparent, therefore, that successive echo pulses differ in amplitude. In the present invention a voltage proportional to the modulation frequency is provided by obtaining a voltage proportional to the average difference in amplitude between successive range gated echo pulses. When the modulation frequency is low then it is evident that the average pulse to pulse difference in amplitude is quite small. Conversely when the modulation frequency is relatively high the average pulse to pulse difference in amplitude is large and thus it is evident that the average pulse to pulse difference in amplitude is a function of the modulation frequency of the echo pulses received at the aircraft.

Reference is now had to Fig. 1 which shows one embodiment of the present invention in which a modulator 10 periodically actuates a transmitter 12 to provide as an output therefrom short duration high carrier frequency exploratory pulses of radiant energy. These exploratory pulses are then fed through transmit-receive switch 14 to a directional antenna 16 which is rotated by an antenna drive 18 through a mechanical link 20. Transmit-receive switch 14 connects the transmitter 12 to the directional antenna 16 during the transmission of exploratory pulses and at the same time disconnects the receiver channel which is presently to be described. During the interim between transmitted pulses and while echo pulses are being received, these connections are reversed and the receiver portion is connected to the antenna 16. Echo pulses of radiant energy received by the antenna 16 are fed through transmit-receive switch 14 and applied to a mixer 22. A second input to mixer 22 consists of continuous wave oscillations from a local oscillator 24. These local oscillations beat with the echo pulses in the mixer 22 to provide as an output therefrom pulses having an intermediate frequency carrier wave. These intermediate frequency I. F. pulses are then fed to I. F. amplifier 26 the output of which is connected to a detector 28. The output of the detector 28 which will be video pulses, is applied to video amplifier 30 the output of which is in turn connected to a conventional cathode ray tube indicator 32. The indicator 32 is preferably of the plan position indication (P. P. I.) type which provides a continuous indication of all targets within the range of the radio object locating system throughout 360 degrees plotted in polar coordinates. To provide synchronism between the angular position of the radial sweeps on the indicator 32 and the angular position of the antenna 16, a suitable link 34 is provided between the antenna drive 18 and the indicator 32. The link 34 may be either mechanical or electrical as desired.

The output of the I. F. amplifier 26 is also applied through an automatic volume control (AVC) circuit 36 to gated detector 38. It has been heretofore stated that the present invention is dependent upon the determination of the pulse to pulse variation in amplitude of returned echo pulses. This pulse to pulse variation is a function of frequency but it is also a function of the average amplitude about which this variation occurs. To eliminate the discrepancies which would otherwise be introduced by variations in average amplitude, the AVC circuit 36 is used. The detector 38 is normally non-responsive to signals applied thereto but is periodically gated into operation in the manner described below. A portion of each exploratory pulse from transmitter 12 is used to actuate a gate generator 40 which provides as an output a gate voltage pulse of a predetermined time duration and waveform. The gate generator 40 may be actuated, alternatively, if desired, by the modulator 10 as indicated by the dashed line 42. The gate voltage from generator 40 is applied through a variable delay circuit 44 as a sensitizing voltage to the detector 38 and to a double clamp circuit 46. Fig. 2a shows the general waveform of the gate voltage which is applied to the detector 38 and to the double clamp circuit 46. The duration of this gate is not limited to any specific value but is preferably about two or three times the time duration of the transmitted exploratory pulses. The double clamp circuit 46 is more fully described in the discussion to follow which relates to Fig. 3. The amount of delay incurred by signals passing through delay circuit 44 is made variable so that the gate voltage applied to detector 38 may be made to occur at a time after the transmission of an exploratory pulse corresponding to the range at which measurements are to be made.

In view of the foregoing, it is evident that the output of detector 38 consists of video signals which are derived from echo pulses returned from objects at a predetermined range from the radio object locating system. These video signals are intentionally distorted by a resistance capacitance circuit (not shown) in the detector 38 and have the general waveform shown in Fig. 2b. As it is desired that the output of the detector 38 be a true indication of the amplitude of the video signal before the output is measured, the circuit is arranged so that the double circuit 46 is placed in operation only after the gated detector 38 has been in operation for a period of time corresponding to the duration of the gate voltage from the generator 40. The gate voltage from generator 40 causes the detector 38 to operate for the duration of positive going portion of the gate voltage. At the trailing edge of the positive going portion of the gate voltage a negative overshoot occurs as is seen in Fig. 2a. This negative overshoot is used to actuate the double clamp circuit 46. Because the output of the gated detector 38 is distorted due to the resistance-capacitance circuit therein such that it has a waveform similar to that shown in Fig. 2b, there is no trouble caused by the fact that the gate voltage which actuates the detector has terminated before the time the double clamp circuit is actuated.

The double clamp circuit 46 provides a voltage which is substantially proportional to the average pulse to pulse difference in amplitude of the video signal output from the detector 38. The voltage output from the clamp circuit 46, being proportional to the pulse difference in amplitude of the selected video signals will be small for low frequency modulated signals and will be large for high frequency modulated signals. This output voltage is applied to an amplifier 48 and the amplified output therefrom is applied to a full wave rectifier 50. The D.-C. voltage which forms an output from rectifier 50 is a voltage whose amplitude is also proportional to the modulation frequency of the echo signals returned from objects at the predetermined range. Since the frequency of the echo pulse amplitude modulation is a minimum when the center line of the antenna is coincident with the ground track, it then follows that the voltage output from the rectifier 50 is likewise a minimum when the center line of the antenna beam is coincident with the ground track. This rectifier voltage is applied as a control signal to a ground marker generator 52. The ground marker generator 52 may be any circuit well known in the art capable of producing a prolonged output voltage when an applied control voltage reaches a minimum value. For example, the generator 52 may be a conventional one-shot or flip-flop multivibrator with the control voltage applied to the cathode of the normally nonconducting tube. The marker generator 52 provides a signal which is applied to the indicator 32 to intensify one or more range sweep traces thereon which traces will be indicative of the ground track of the aircraft.

The output from the rectifier 50 may also be utilized to provide an indication of the ground speed of the aircraft. This can be done as follows. Since the modulation frequency of the received echo pulses is a function of the ground speed of the aircraft and of the angle between the center line of the antenna beam and the ground track of the aircraft, the angle at which the antenna points may be fixed at some predetermined angle with respect to the axis of the aircraft and the voltage developed at the rectifier 50 will then be a function of the ground speed only. This voltage is used to actuate a meter 54 preferably of the vacuum tube type which is calibrated to read the ground speed directly. The circuit as shown may be modified to permit the meter 54 to indicate ground speed even though the antenna be continuously rotating. Such an indication would normally be an indication provided only when the antenna is stationary. This indication may be accomplished by inserting a gated amplifier between the rectifier 50 and the meter 54 and actuating or gating the inserted amplifier from the marker generator 52. The meter 54 will then receive a voltage only at the time the antenna is pointing in the direction of the ground track.

Reference is now had to Fig. 3 of the drawing which illustrates a schematic circuit diagram of the double clamp circuit 46 of Fig. 1. The circuit comprises a transformer 56 having a primary winding and a center tapped secondary winding. The primary winding of the transformer 56 is connected to the variable delay circuit 44. The center tap of the secondary winding of the transformer 56 is connected to the gated detector 38. One end of the secondary winding of the transformer 56 is connected to a parallel combination of a capacitor 58 and a resistor 60. The other end of the capacitor-resistor combination 58—60 is connected to the anode 62 of vacuum tube 64, preferably of the diode type. The remaining end of the secondary winding of the transformer 56 is connected to a parallel combination of a capacitor 66 and a resistor 68. The remaining end of the capacitor-resistor combination 66—68 is connected to the cathode 70 of a vacuum tube 72. The cathode 74 of the vacuum tube 64 is connected to the anode 76 of vacuum tube 72 and together they are connected to one terminal of a capacitor 78. The remaining terminal of the capacitor 78 is connected to a resistor 80 the remaining terminal of which is connected to ground.

As heretofore stated it is desired that the output of the circuit shown in Fig. 3 be indicative of the frequency of the amplitude modulation of the video pulses from the gated detector 38. The output from the delay circuit 44 which has a waveform as shown in Fig. 2a is applied through the transformer 56 and the intervening resistor capacitor circuits to the tubes 64 and 72. The transformer connections are so made that the positive portion of the voltage applied from the variable delay circuit 44 is applied as a negative voltage to the anode 62 and as a positive voltage to the cathode 70. These polarities are such that the tubes 64 and 72 will not be rendered conducting. On the negative portion of the voltage from the variable delay circuit 44 the anode 62 is made positive with a resulting current flow through the capacitors 58 and 78 and resistor 80 thus charging the capacitor 58 with a polarity as shown. This negative portion of the gate voltage is also applied to the cathode 70 in such a manner that the tube 72 is rendered conducting with a resulting current flow through capacitors 66 and 78 and resistor 80 charging the capacitor 66 with a polarity as shown. If the voltage applied from the detector 38 is zero or a constant, the amount of charge added to the capacitor 78 by a current flow through the tube 64 will be exactly balanced by the amount of charge taken from the capacitor 78 by current flow through the tube 72 with the result that no net change in charge will appear on the capacitor 78. In the absence of a signal from the variable delay circuit 44 the polarity of the charges on the capacitors 58 and 66 is such that the tubes 64 and 72 are nonconducting and the charge on the capacitor 78 will not change. When the amplitude of the voltage from the gated detector 38 varies from its previous value charge will be added to or taken from the capacitor 78 in accordance with the direction and amount of charge of the voltage from the detector 38. The current which flows into the or out of the capacitor 78 to alter its charge flows through the resistor 80. The voltage across the resistor 80 is therefore proportional to the pulse to pulse variation in amplitude of the signals from the gated detector 38. The voltage across the resistor 80 is utilized as the output from the double clamp circuit 46 in a manner described above. Other circuits well known in the art capable of providing an output voltage proportional to the difference in amplitude of input signals may be used equally well in the apparatus illustrated by Fig. 1 and therefore the invention is not limited to the use of the specific circuit shown in Fig. 3.

While there has been described what is at present considered the preferred embodiment of the present invention it will be obvious to those skilled in the art that various changes and modifications may be made therein without departing from the scope and spirit of the invention. For example the apparatus of Fig. 1 will operate equally well if the input to the AVC circuit 36 is taken from the normal receiver portion of the system immediately after the I. F. amplifier 26 or after the detector 28. The other changes such as the substitution of a gated amplifier for the gated detector 38 in the latter instance will be obvious to those skilled in the art.

What is claimed is:

1. In a moving craft, in combination with a radio object locating system having at least a transmitter of pulses of electrical energy, a receiver for receiving target echo pulses having varying modulation components due to the movement of said craft, and an indicator for displaying said target echo pulses, apparatus providing ground track and ground speed data concerning the movement of the aircraft, said apparatus comprising a gate voltage generator synchronized with said transmitter, a variable delay circuit connected to the output of said gate voltage generator, automatic volume control means for controlling the output of said receiver, a detector connected to receive said target echo pulses from the output of said receiver and connected to said delay circuit, a double clamper circuit connected to the output of said detector and of said delay circuit, for deriving an output that is proportional to the differences in amplitude between said target echo pulses, a rectifier connected to the output of said double clamper circuit, a speed measuring means connected to the output of said rectifier for indicating the ground speed of said craft when said rectifier output is a minimum, and a signal generator connected to the output of said rectifier and to said indicator for applying a signal to said indicator substantially in time coincidence with the minimum output from said rectifier, which signal indicates the ground track of said craft.

2. In a moving vehicle, in combination with a radio object locating system having at least a transmitter of pulses of electrical energy, a receiver for receiving target echo pulses having varying modulation components due to the movement of said vehicle, and an indicator for displaying said target echo pulses, apparatus providing ground track and ground speed data concerning the movement of the vehicle, said apparatus comprising a gate voltage generating means synchronized with said transmitter, variable delay means connected to the output of said gate voltage generating means, detector means connected to the output of said receiver and of said delay means, signal comparison means connected to the output of said detector means and of said delay means for deriving an output that is proportional to the differences in amplitude between said target echo pulses, speed measuring means connected to the output of said signal comparison means for indicating the ground speed of said vehicle when the output of said signal comparison means is a minimum, and a signal generating means connected to the output of said signal comparison means and to the indicator of the radio object locating system for applying a signal substantially in time coincidence with the minimum output from said signal comparison means to the indicator which indicates the ground track of said vehicle.

3. In a moving craft, in combination with a radio object locating system having at least a transmitter of pulses of electrical energy, a receiver for receiving target echo pulses having varying modulation components due to the movement of said craft, and an indicator displaying said target echo pulses, apparatus providing ground track data concerning the movement of said craft, said apparatus comprising gate voltage generating means synchronized with said transmitter, variable delay means connected to the output of said gate voltage generating means, detector means connected to the output of said receiver and of said delay means, signal comparison means connected to the output of said detector means and of said delay means, for deriving an output that is proportional to the differences in amplitude between said target echo pulses, and signal generating means connected to the output of said signal comparison means and to said indicator for applying a signal substantially in time coincidence with the minimum output from said signal comparison means to the indicator which indicates the ground track of said craft.

4. In a moving craft, in combination with a radio object locating system having at least a transmitter of pulses of electrical energy, a receiver for receiving target echo pulses having varying modulation components due to the movement of said craft, and an indicator for displaying said target echo pulses, apparatus providing ground speed data concerning the movement of said craft, said apparatus comprising gate voltage generating means synchronized with said transmitter, variable delay means connected to the output of said gate voltage generator means, detector means connected to the output of said receiver and of said delay means, signal comparison means connected to the output of said detector means and of said delay means, for deriving an output that is proportional to the differences in amplitude between said target echo pulses and speed measuring means connected to the output of said signal comparison means for indicating the ground speed of said craft at substantially the time of minimum output from said signal comparison means.

5. In a radio object locating system borne by a moving craft and including means for transmitting pulses of radio frequency energy, means for receiving target echo pulses having varying modulation components due to the movement of said craft, and means for displaying said target echo pulses, apparatus comprising detector means receptive of output pulses from said receiving means, variably delayed gating means coupled to said detector means and synchronized with said transmitting means, for gating said detector means when said target echo pulses of a given range are received, a double clamp circuit coupled to the outputs of said detector and gating means, for deriving an output that is proportional to the difference in amplitude of said received target echo pulses, the output of said double clamp circuit having a minimum amplitude for targets along the ground track of said craft and said minimum amplitude being proportional to the speed of said craft.

6. The apparatus of claim 5, further including means for utilizing the output of said double clamp circuit, comprising measuring means for indicating a value proportional to the amplitude of the output of said double clamp circuit, and marker generator means coupled to the output of said double clamp circuit and having its output coupled to said displaying means, said measuring means indicating the velocity of said craft and said marker generator means causing the ground track to be indicated on said displaying means, when the output of said double clamp circuit is a minimum.

7. The apparatus of claim 6, wherein said double clamp circuit comprises, first and second diode vacuum tube means, the anode of said first tube means being connected to the cathode of said second tube means, first and second resistor-capacitor parallel networks, one end of said first network being connected to the cathode of said first tube means and one end of said second network being connected to the anode of said second tube means, transformer means having primary and secondary windings, the ends of said secondary winding being connected respectively to the other ends of said first and second networks, the output of said detector means being connected to the center of said secondary winding and the output of said gate generating means being connected across said primary winding, and a capacitor-resistor series network connected to the anode of said first tube means, for deriving across the resistor in said series circuit a potential proportional to the amplitude modulation of said target echo pulses.

8. The apparatus of claim 5, further including means for utilizing the output of said double clamp circuit, comprising measuring means for directly indicating the velocity of said moving craft when the output of said double clamp circuit is at a minimum.

9. The apparatus of claim 5, further including means for utilizing the output of said double clamp circuit, comprising marker generator means, the output of which is coupled to said displaying means, for indicating upon said displaying means the ground track of said moving craft when the output of said double clamp circuit is at a minimum.

10. In a radio object locating system borne by a moving craft and including means for detecting received target amplitude modulated echo pulses having a minimum amplitude difference between successive pulses along the ground track of said craft, which is proportional to the speed of said craft, and means for gating said detecting means to limit its operation to target echo pulses of a given range, a double clamp circuit for producing an output proportional to said amplitude difference, comprising first and second diode vacuum tube means, the anode of said first tube means being connected to the cathode of said second tube means, first and second resistor-capacitor parallel networks, one end of said first network being connected to the cathode of said first tube means and and one end of said second network being connected to the anode of said second tube means, transformer means having primary and secondary windings, the ends of said secondary winding being connected respectively to the other ends of said first and second networks, the output of said detector means being connected to the center of said secondary winding and the output of said gate generating means being connected across said primary winding, and a capacitor-resistor series network connected to the anode of said first tube means, for deriving across the resistor in said series circuit a potential proportional to said minimum amplitude difference between said target echo pulses.

11. A radio object locating system borne by a craft in flight for determining the ground-track of said craft, comprising rotatable antenna means, means for transmitting through said antenna means pulses of radio frequency energy, means for receiving from said antenna means target echo pulses having varying modulation components due to the movement of said craft, means for detecting the output pulses of said receiving means, means for controlling said detecting means in accordance with a given target range, means for deriving from said detecting means a voltage proportional to the difference in amplitude of respective successive target echo pulses, said voltage being a minimum for targets along the ground track of said craft, and means for utilizing said minimum voltage to provide an indication of said ground track.

References Cited in the file of this patent

UNITED STATES PATENTS

| | | |
|---|---|---|
| 2,206,896 | Higgins | July 9, 1940 |
| 2,223,224 | Newhouse | Nov. 26, 1940 |
| 2,248,215 | Budenbom | July 8, 1941 |
| 2,261,272 | Newhouse | Nov. 4, 1941 |
| 2,268,587 | Guanella | Jan. 6, 1942 |
| 2,391,554 | De Forest | Dec. 25, 1945 |
| 2,403,625 | Wolff | July 9, 1946 |